Aug. 24, 1926. 1,597,348
C. L. FORTIER
METHOD AND MEANS FOR CONTROL OF TEMPERATURE
Filed April 24, 1924 — 2 Sheets-Sheet 1
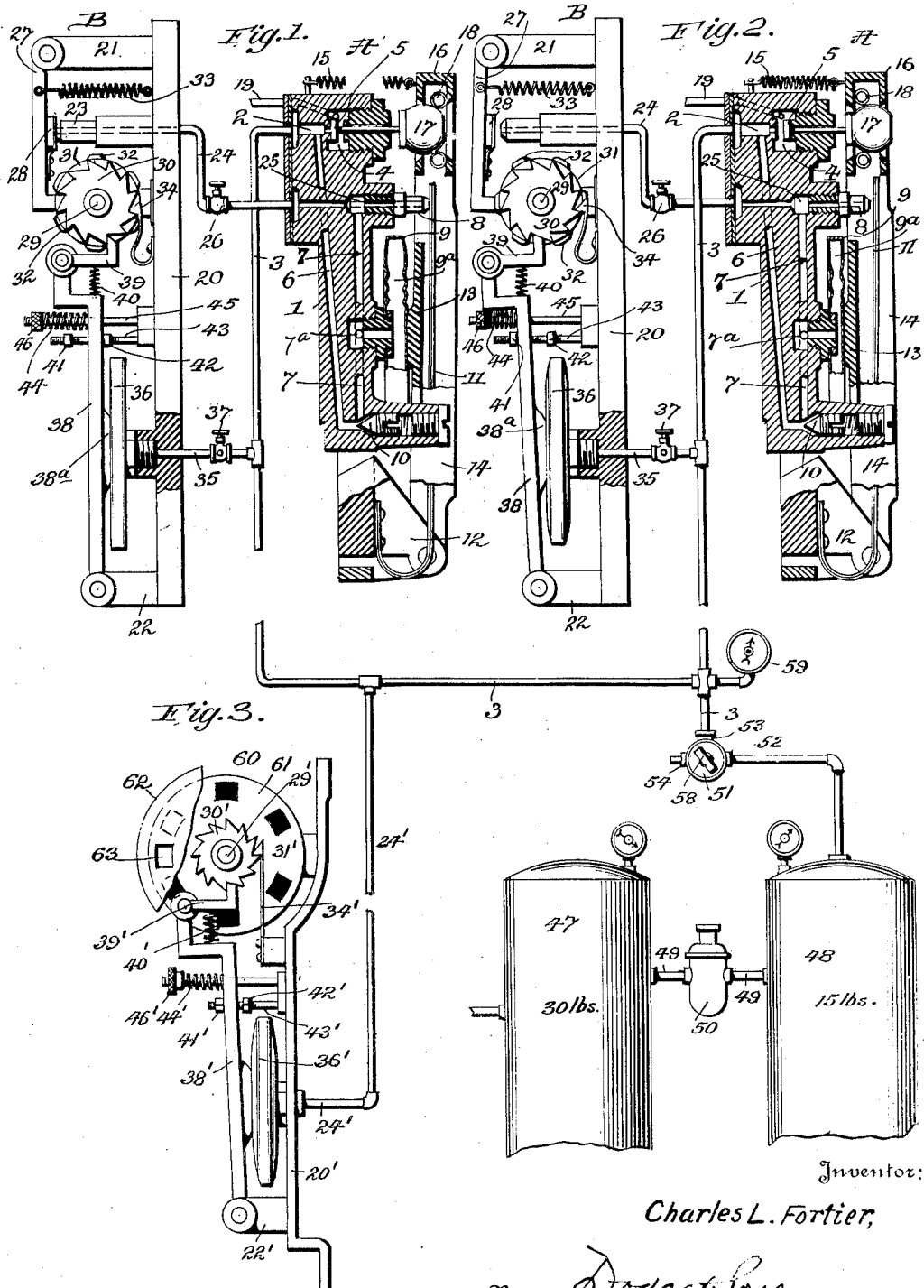
Inventor:
Charles L. Fortier,
By Dodge & Sons,
Attorneys.

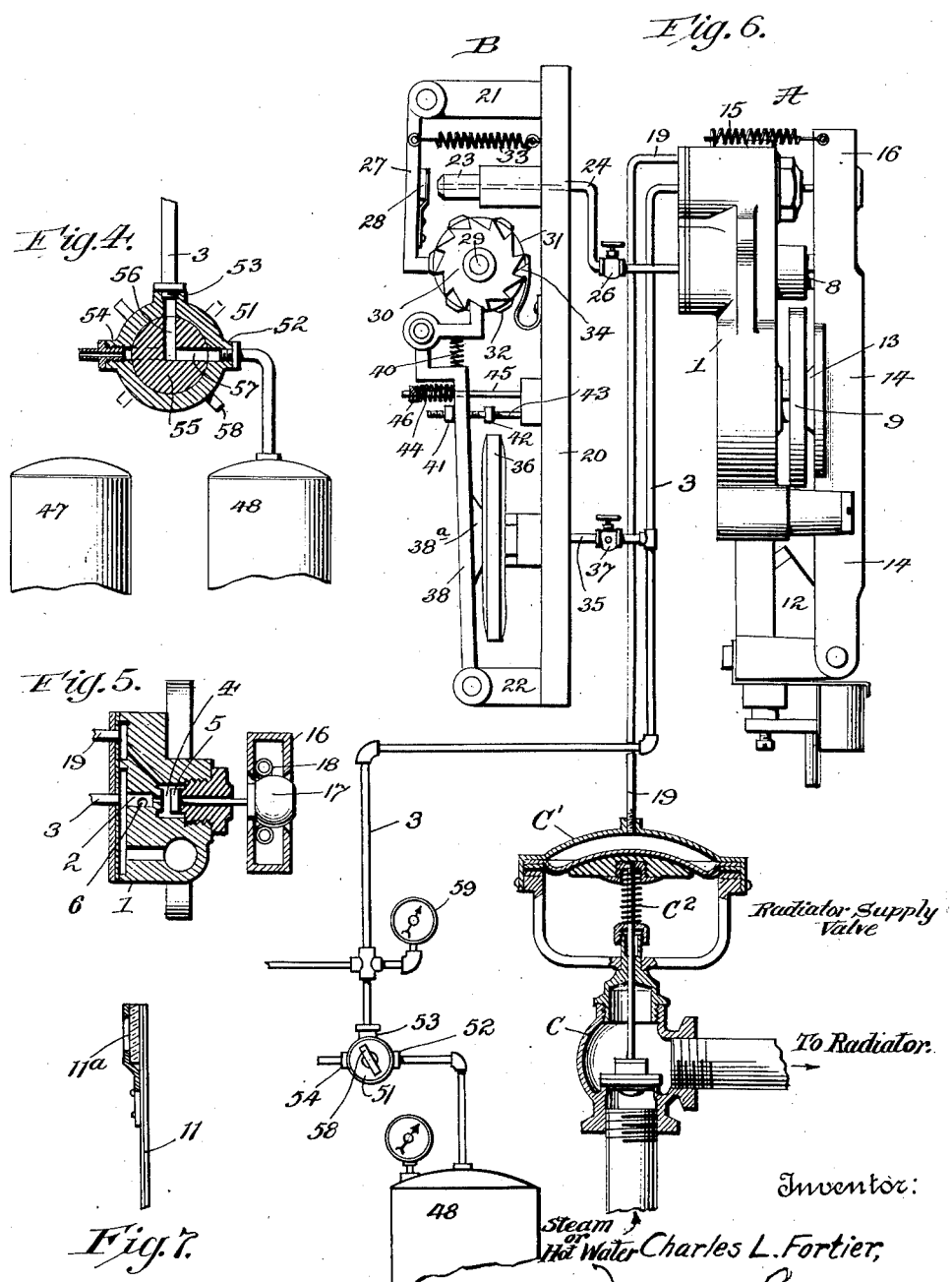

Patented Aug. 24, 1926.

1,597,348

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

METHOD AND MEANS FOR CONTROL OF TEMPERATURE.

Application filed April 24, 1924. Serial No. 708,796.

This invention pertains to temperature control systems of the compressed air type, and is designed to provide a simple and efficient mode and means of controlling at will from a distant point, the action of thermostats in selected rooms of a building so as to cut off the heat; and to restore the thermostats to normal operation, so as to produce and maintain ordinary daytime temperature in the rooms controlled thereby.

In schoolhouses and other buildings where some of the rooms are to be occupied at night and maintained at normal or daytime temperature, the rooms not so occupied have their heat cut off as a matter of fuel economy.

Under the present invention the lowering of temperature in selected rooms and its restoration to normal, are effected by a manipulation of the compressed air in the system, preferably at a point near the source of supply.

The word "normal" is here used as meaning, when referring to temperature, 70 degrees Fahrenheit, and when referring to air pressure as meaning 15 pounds per square inch, the temperature and pressure commonly used in regulating systems. Other figures may of course be adopted without changing the principle or mode of operation of the devices employed to effect the action of the thermostats:

In the accompanying drawings illustrating one embodiment of my invention:—

Figure 1 shows in section a thermostat, and in side elevation with portions broken away, a controlling device therefor, both connected with and receiving air under pressure from a common source, said devices being shown in position for normal operation of the thermostat;

Fig. 2, a similar view, but with the parts set to cut off the heat supply;

Fig. 3, a face view of an indicating device whereby the latest setting of the thermostats may be at any time ascertained;

Fig. 4, a sectional view of a manually operated three-way valve with a restricted waste port, whereby the air-pipe system may be bled or vented to lower the pressure therein temporarily, when a change in the temperature is to be made from normal to abnormal, and vice versa;

Fig. 5, a cross section in the plane of the axis of the three-way valve and its stem;

Fig. 6, a view showing in elevation the thermostat A, control device B, and the main valve controlling the heat supply;

Fig. 7, a detail view showing a preferred construction of the leak-port valve carried by the thermostatic bar.

The drawings are largely diagrammatic, for clearness and convenience of explanation.

In said drawings A indicates, in section, a thermostat of the general type illustrated and described in U. S. Letters Patent No. 1,109,981, granted and issued to me September 8, 1914, and B an attachment or associated device for controlling the functioning of the thermostat. The devices A and B may be combined in one integral structure, or may be two separate devices mounted upon a compound or common pipe-head, one beside the other. In some cases where but limited space is available they may be placed at more or less widely separated points and connected by piping of requisite length.

The thermostat A is of the type now generally employed in the well-known Johnson system of temperature regulation, comprising a frame or body 1 provided with an inlet port 2 for air under pressure supplied by a pipe or main 3, the port 2 communicating with the chamber 4 of a three-way valve 5 by which entrance of air to the valve chamber is permitted or cut off, according as the valve is seated upon or unseated from the mouth of inlet port 2. The port 2 communicates by passages 6 and 7 with a leak-port nipple 8 and with the chamber $9^a$ of an expansion motor 9, one or both walls of which may be provided with corrugations to enable it or them to bulge outward under pressure of air within said chamber. A port $7^a$ is indicated in Figs. 1 and 2 connecting passage 7 with the space into which the neck or nipple of the expansion motor 9 is screwed or otherwise secured. In practice, however, passage 7 may extend directly through said space, as a matter of convenience. A conical or needle valve 10 controls the flow of air through the passages 6 and 7 and to the leak-port nipple 8, said valve being so set as to make the capacity of the passages less than that of the leak-port nipple 8, so that when said leak-port is open the air pressure within motor 9 cannot build up sufficiently to cause expansion or outward flexure of its outer wall.

11 indicates a bi-metallic bar, the upper end of which lies in front of and close to the end of the leak-port nipple 8, and is in practice provided with a pad or valve 11$^a$ of suitable material, preferably celluloid, which when brought into contact with the end of the nipple seals the leak-port. This bar 11 is carried by a saddle 12 suitably mounted in the main frame 1 and made adjustable, but as these details are not material to the present invention they will not be further referred to.

Standing in front of and held in contact with the outer wall of chamber 9$^a$ is a disk or saucer 13 carried by a swinging frame 14 pivotally mounted in frame 1, and urged inward at its free end by a stressed spring 15 so that the disk or saucer 13 is held in close contact with the outer wall of said chamber. Under this arrangement any expansion of the chamber 9$^a$ and consequent bulging of its outer wall will cause pressure upon and outward movement of disk 13 and frame 14. Swinging frame 14 carries at its upper end a box or casing 16, the vertical front and rear walls of which are formed with a circular opening sufficient to receive the head 17 of the stem or valve 5. This head 17 is of generally spherical form or may be a complete sphere, and is encompassed by a contractile annular spring 18, preferably made of helically coiled wire bent into circular form and having its ends united. The internal diameter of this annular spring is such that the spring is always under slight tension which is increased as said spring is moved over the mid or equatorial plane of the head 17.

In Fig. 1 the spring 18 is shown moved outward beyond the equatorial plane of the head 17, while the valve stem and valve 5 are shown moved inward, and the valve seated on the mouth of inlet port 2, due to the contraction of the spring 18 after passing the mid-plane of said head 17. Communicating with or opening out of three-way valve chamber 4 is a branch pipe 19, through which air may pass to the self-opening valve C of a radiator or other heating element, under pressure sufficient to overcome the unseating force, and to hold the valve closed in the manner well known and employed in said Johnson control system.

So long as valve 5 is seated against the mouth of inlet port 2, no air will pass to or through pipe 19, but said pipe will be vented through chamber 4 and the relatively free opening through which passes the stem of valve 5, hence the spring C$^2$ of the radiator supply-valve C being unopposed by air pressure in its actuating motor C', will cause said supply valve to open, and heating medium will flow through the radiator supply pipe. If, now, through rise of temperature, the bi-metallic bar 11 be caused to bend outward or away from the leak-port nipple 8 and to unseal the same, motor 9 will be vented to the atmosphere, and will collapse and permit frame 14 to swing inward under the stress of spring 15, thereby shifting the contractile spring 18 to the opposite side of the equatorial or medial plane of head 17, and said spring on passing such plane will act to move the head 17 and the valve stem and valve 5 outward, or to the position indicated in Fig. 2. This will unseat valve 5 from the mouth of port 2 and seat its opposite face against the inner end of the nipple through which the stem of said valve passes, thus preventing any bleeding or escape of air through said nipple. Port 2 being thus opened, air will pass by branch 19 to the pneumatic motor C' which effects closure of the main or heat-control valve C, in the manner well understood in the art and employed in the Johnson system.

The device B by which the thermostats of rooms which are not to be occupied are set to cut off the heat from such rooms, will next be explained, it being understood that its illustration is essentially diagrammatic, though sufficient to make plain the principle of construction and mode of operation. This device comprises a main base-plate or frame 20 having at its upper end a pair of projecting arms 21, and at its lower end a second pair of arms 22. Projecting from the face of the frame 20 is a nipple 23 having a central passage which connects by a pipe 24 with a chamber 25 at the inner end of the leak-port nipple 8 of the thermostat A. This pipe 24 is provided at any suitable point with a valve 26, by which communication between the two instruments may be opened or closed at will.

Suspended from the arms 21 of frame 20 is a bar or lever 27 carrying on its inner face and directly opposite the vent or opening of nipple 23, a pad or valve 28 of celluloid or other suitable material, which serves when brought into contact with the end of said nipple, to seal the vent or opening thereof. In horizontal plane with the inturned end of said bar or lever 27 is a spindle or shaft 29 carrying a ratchet wheel 30 and a disk 31, the periphery of which disk is formed or furnished with a series of lugs or projections 32 spaced at equal angular distances around said periphery, and with spaces between said lugs, advisably a little more extended in the direction of the circumference than said lugs or projections 32. The disk 31 is in vertical plane with the bar 27.

Lever or bar 27 is drawn toward the nipple 23 by a spring or springs 33, and as shown in Fig. 1, when one of the peripheral spaces of the disk 31 intermediate the lugs 32 lies directly opposite the inturned end of said bar 27, the bar will be permitted to swing sufficiently inward to bring the pad or valve 28 into sealing relation with the vent of nipple 23, thereby preventing escape of air from chamber 25 of the thermostat through said vent, even though valve 26 be at the time fully opened. If, however, one of the lugs or projections 32 on disk 31 be brought directly into the path of the inturned end of bar or lever 27, as shown in Fig. 2, the pad or valve 28 will be held away from the vent or opening of nipple 23. If valve 26 be then open, the chamber 25 of the thermostat will be vented, and even though the leak-port 8 of said chamber be sealed by the pad 11ª carried by the bi-metallic bar 11, air pressure cannot build up in the motor 9 of the thermostat, and the swinging frame 14 will hence be held in its inner position, with the valve 5 unseated from the inlet port 2. Air will accordingly pass by the branch pipe 19 to the pneumatic motor C' of the radiator with which the thermostat is associated, and will hold the main valve C closed, thereby shutting off the supply of heating medium to the radiator and the room in which it is located.

In the drawing I have represented the ratchet wheel 30 as provided with twelve teeth, and the disk 31 as provided with six lugs and six spaces, or in other words with twelve divisions corresponding to the twelve ratchet teeth, but any other desired number of ratchet teeth and of lugs and spaces may be employed, provided the aggregate number of lugs and spaces equal the number of ratchet teeth. The lugs 32 will advisably be beveled or rounded at their leading and trailing sides or ends, to enable them to ride under and force back the end of lever 27, or to cause said lever to pass into contact with the periphery of the disk between the lugs without undue suddenness.

To prevent backward rotation of the ratchet wheel and disk, which are both fast on the common spindle, a holding pawl 34, here shown as having a spring-supporting stem, is secured to the frame or plate 20 in position to be forced back by the ratchet teeth when the ratchet is rotated in one direction, but to drop behind and engage the teeth as one after another passes the engaging nose or end of the pawl.

For the purpose of rotating the spindle 29, ratchet wheel 30, and disk 31 step by step, and thereby bringing successively a projection and a depression opposite the inturned end of bar or lever 27, a second branch pipe 35 is carried from the main air pipe 3 through the back-plate or base of frame 20 to the interior of a hollow shell or chamber 36, the outer wall or face of which is formed by a thin metallic disk, preferably corrugated to facilitate its outward bulging or expansion when filled with air under pressure. The pipe 35 is advisably provided with a closing and venting valve 37, whereby communication may be opened between the main pipe 3 and the shell or casing 36, or such communication shut off and said shell or casing vented, as desired.

Pivotally supported between the lower arms 22 of frame or plate 20 is an upwardly extending lever 38 outwardly offset at its upper end as shown, and carrying at its upper extremity a pivoted pawl or dog 39 in plane with the ratchet wheel 30, and pressed toward the same by a spring 40. The swing or play of this lever 38 is limited by nuts 41 and 42 adjustable upon a threaded rod 43, one of said nuts lying in front and the other back of the lever, so that the field and the range of the movement of said lever may be nicely regulated and determined. Lever 38 is normally pressed toward the diaphragm or front wall of casing 36 by a spring 44 encircling a rod or stem 45 projecting from the base or frame 20, bearing at its inner end against said lever and at its outer end against a milled nut 46, by turning which the compression of spring 44 and the force of its action may be adjusted.

It will be seen that under this construction the spring 44 will urge and hold the lever 38 at the inward limit of its swing or movement, or against the stop-nut 42, when the pressure in the system and diaphragm is reduced to a predetermined point. Now, if air under normal pressure be delivered to the system and chamber 36 and the diaphragm be forced outward, said diaphragm bearing against the disk or saucer 38ª of lever 38 will force said lever outward against the resistance of spring 44, causing pawl 39 to rotate or advance the ratchet wheel 30 one tooth.

Assuming that the parts of the control device or instrument B are in the position indicated in Fig. 1, and the chamber 36 is deflated, advance of the ratchet one tooth will cause one of the lugs 32 to ride under the inwardly projecting end of lever or bar 27, thereby swinging the latter outward, and venting the nipple 23 and through it the chamber 25 of the thermostat. This, as already explained, will cause valve 5 to be unseated and air to be delivered to the closing pneumatic motor C' of the primary or heat-control valve C, thus shutting off the heat, the parts then assuming the positions indicated in Fig. 2. If, now, the pressure in the system and in chamber 36 be lowered, spring 44 of the control instrument B will restore the pawl 39 to the position indicated in Fig. 1, that is to say, it will move inward and engage the tooth succeeding that on which it last acted. On the return of pressure to normal, ratchet 30 will be turned the distance of one tooth, lever 27 will fall into a space or depression of disk 31 thereby closing vent nipple 23, and so long as this condition obtains the thermostat A will act in its usual way to control the main valve in accordance with temperature changes, and will maintain the usual daytime temperature in the room or apartment with which it is associated.

The means for thus causing alternately normal and abnormal pressure in the air system, at will, will now be explained. 47 indicates an air tank into which air is forced by a suitable pump until a pressure of 30 pounds or thereabout is established. This tank 47 is connected with a second tank 48 by a pipe 49 containing a reducing valve 50 which is usually adjusted to permit and maintain a pressure of 15 pounds in the tank 48, with which latter tank the main air-supply pipe 3 communicates. The two tanks and the reducing valve are provided with a view to maintaining a uniform pressure at all times in the main air pipe, the pump being caused to go automatically into and out of operation as the pressure in the main pipe falls below or rises above the predetermined pressure deemed desirable.

51 indicates a three-way valve interposed in the air pipe 3 at a point near the tank 48. This comprises a shell having necks 52, 53 and 54, of which the neck 52 is connected by a short length of pipe with the tank 48, and the neck 53 with the main air pipe 3, while the neck 54 is provided with a restricted waste port, the three necks being of course suitably bored to form passages opening into the interior of the shell or casing of valve 51. Within said casing, which is of circular cross section, is a rotatable plug 55 having two connecting radial ports or passages 56 and 57, here shown in 90 degree relation, as are the three necks 52, 53 and 54 and their passages. A cross handle 58 or equivalent means is provided for turning the plug 55.

If, now, it be desired to lower the pressure in the main air-pipe 3 without wasting air from the tank 48, it is necessary only to turn the plug 55 so as to carry its port or passage 56 into register with the neck 54 and its waste port, and to carry the port or passage 57 into register with the port of neck 53 and with pipe 3. The air from the various instruments supplied by pipe 3 will thus be vented through the waste port of valve 51, the restriction of which insures a venting of the more distant instruments synchronously with the nearer ones.

A pressure gage 59 in the pipe 3 above or beyond the valve 51 enables the attendant to ascertain the degree of lowering of the air pressure in said pipe, and when this falls from the normal fifteen to about eight pounds, valve 51 is promptly turned back to restore communication between the tank 48 and pipe 3. This causes air to flow not only to the thermostats A but also to the shell or chamber 36 of the setting or actuating devices B, causing each of said devices whose valves 26 and 37 are at the time open, to advance its ratchet wheel one tooth, and to make the desired change of adjustment in the setting of the thermostat. The change is effected in a very brief period of time, and as above explained, involves merely the turning of the plug of valve 51 first in one direction and a moment after in the opposite direction, its range of movement being advisably restricted by suitable stops so that it may with ease and certainty be carried to a stop at one or the other adjustment as desired. Under this arrangement the tank pressure remains constant, and the air-pipe pressure likewise remains constant except for the temporary reduction of pressure in the latter when a change of adjustment is desired.

With the apparatus constructed and installed as described, the valves 26 and 37 are opened in all those rooms, apartments, and spaces in which it is desirable to cut off the heat supply, while leaving the other rooms, apartments and spaces under full thermostatic control and supplied with heat to maintain normal daytime temperature therein. If, however, it be not desired to cut off the heat supply in certain of the rooms, the valve 26 will be closed, and the thermostats will function normally in all the rooms, apartments and spaces in which said valve is closed.

Fig. 3 illustrates a form of indicator 60 constructed and operating in the same manner precisely as does the control device B so far as effecting rotation of the ratchet wheel and disk is concerned, but employing in lieu of the disk having peripheral projections and depressions, a disk 61 having a white ground with blackened sections or targets spaced at equal angular distances about its axis and near its periphery. The face of disk 61 is covered by a shell or casing 62, a fragmentary portion only of which is shown in Fig. 3, said casing having a window or opening 63 through which one of the blackened sections or an intermediate white space may be seen, the window being located to register therewith. The black sections or targets indicate that the last adjustment was to secure a low or night temperature, while the white spaces indicate daytime or normal room temperature. Parts of the indicator, Fig. 3, which correspond with parts of the control devices B are represented by the same numerals primed. This indicator is connected by a branch pipe 24' with the main air-pipe 3, and is located near the air tanks and the valve 51 so that the attendant may readily observe its indication, and know the condition or the setting of the instruments in the rooms which have and in those which have not the valves 26 and 37 closed. It will of course operate synchronously with the instruments A whenever the latter are operated.

The air pipe 3 and its branches together with the air passages in the thermostats A constitute a compressed air conduit in which are inserted or included the several pneumatic motors above described.

It is of course understood that a thermostat A and a control device B will be placed in each room or apartment, in corridors, and like places throughout the building, and connected with the main air-pipe or conduit.

The embodiment here shown is illustrative merely, and the usual changes of the mechanic as distinguished from the work of the inventor, are of course contemplated and within the purview of the invention. For instance, any well-known and suitable type of pneumatic motor and of pawl and ratchet mechanism may be used, and other modifications will be obvious to those skilled in the art.

While the embodiment here described is based upon a lowering of the air pressure from the normal, which is the preferred plan, it is possible to raise the pressure above normal and thereafter restore it to normal. This, however, involves a risk of injury to diaphragms and other parts of the apparatus which is avoided by decreasing instead of increasing the air pressure as related to normal pressure.

What is claimed is:—

1. In a temperature control system of the compressed air type, a pipe or conduit for the compressed air; a three-way valve in said conduit for alternately opening and closing said conduit to permit or prevent the passage of air to the actuating motor of a heat-control valve; a pneumatic motor in communication with said air conduit for actuating said three-way valve, provided with two vents, the opening of either of which will vent the motor and permit a return movement of its movable wall; a valve for sealing and unsealing one of said vents, carried by a member movable in sealing and unsealing directions in response to rise and fall of temperature; a second valve for sealing and unsealing the other of said vents; pawl and ratchet mechanism for effecting the alternate sealing and unsealing of said second vent by successive step-by-step advances of the ratchet; a second pneumatic motor in communication with the air conduit, serving to actuate said ratchet mechanism in response to alternate decrease and increase or restoration of pressure in said air conduit; and means for temporarily varying the air pressure in said conduit and restoring it to normal.

2. In a temperature control system of the compressed air type, a supply source of heating medium; an air conduit; a source of air supply, a valve for controlling the supply of heating medium to a room or apartment; means tending normally to open said valve; a pneumatic motor connected with the air conduit and serving when supplied with air to close said valve and maintain it closed; a three-way valve in said conduit between the source of air supply and said heat-control valve, for alternately opening and closing said conduit to permit the passage of air to the actuating motor of said heat-control valve, or to cut off the air supply thereto and to vent said motor; a second pneumatic motor in communication with the air conduit for actuating the three-way valve, said motor provided with two vents the opening of either of which will vent said second motor and permit a return of its movable wall; a valve for sealing and unsealing one of said vents, carried by a member movable in sealing and unsealing directions in response to rise and fall of temperature; a second valve for sealing and unsealing the other of said vents; mechanical means for moving said second vent valve in opening and closing directions; a third pneumatic motor in communication with the air conduit, serving to actuate said mechanical means in response to alternate decrease and increase or restoration of pressure in said air conduit; and means for temporarily varying the air pressure in said conduit and restoring it to normal.

3. A temperature control system of the compressed air type, comprising a source of air under pressure; a self-opening main valve controlling the delivery of the heating medium; a pneumatic motor for closing said main valve and maintaining it closed; a pipe or conduit for delivering compressed air from the source to said motor; a secondary valve included in said pipe line, serving alternately to open communication between the source of compressed air and the motor of the heat-control valve, and to close said communication and vent the pressure chamber of said motor; a second pneumatic motor in communication with the air pipe, provided with a vent, and serving to actuate the secondary valve; a third valve for alternately sealing and opening said vent, carried by a bar movable in opposite directions in response to rise and fall of temperature; a second vent for said second pneumatic motor; a valve for alternately sealing and opening said second vent; a third pneumatic motor in communication with the air pipe, for alternately sealing and unsealing said second vent; and means for temporarily reducing and then restoring the pressure in the air pipe to actuate said third motor, and thereby to seal the second vent if unsealed or to unseal it if sealed.

4. In a temperature control system of the compressed air type, a conduit connecting a source of compressed air with a heat-control valve; a pneumatic motor for actuating said heat-control valve; a valve in said conduit serving alternately to open said conduit to permit air to pass to the heat-control valve, and to cut off the supply of air thereto and vent the actuating motor of said heat-control valve; a second pneumatic motor for actuating said air conduit valve, said motor provided with two vents; a thermostatically-actuated valve for sealing and unsealing one of said vents in response to variations in temperature; a valve for sealing and unsealing the second of said vents; a third penumatic motor communicating with the air-conduit and serving alternately to open and close the second vent in response to variations in air pressure; and means for temporarily reducing the pressure in the air conduit and thereafter restoring it to normal.

5. In a temperature control system of the compressed air type, a conduit connecting a source of compressed air with a heat-control valve; a pneumatic motor for actuating said heat-control valve; a valve in said conduit serving alternately to open said conduit to permit air to pass to the heat-control valve, and to cut off the supply of air thereto and vent the actuating motor of said heat-control valve; a second pneumatic motor for actuating said air conduit valve, said motor provided with two vents; a thermostatically-actuated valve for sealing and unsealing one of said vents in response to variations in temperature; a valve for sealing and unsealing the second of said vents; a third pneumatic motor communicating with the air-conduit and serving alternately to open and close the second vent in response to variations in air pressure; means for temporarily reducing the pressure in the air pipe and thereafter restoring it to normal; and a valve in the branch of the main air conduit, communicating with the last-mentioned pneumatic motor, whereby the same may be cut out of action.

6. In a temperature control system of the compressed air type, a conduit connecting a source of compressed air and a heat-control motor; means in said conduit serving to actuate said motor to control the temperature; a pneumatic device provided with two vents for actuating said means; a thermostatically-actuated valve for sealing and unsealing one of said vents in response to variations in temperature; a second valve for sealing and unsealing the said second vent; a motor connected with the air conduit and serving to actuate said second valve in response to changes in air pressure; and means for changing said air pressure and restoring it to normal.

7. The method of controlling the functioning of the thermostatic devices of a temperature-control system of the compressed air type, which method consists in causing a cycle of abnormal pressure followed by return to normal, and consequent change in the setting of selected thermostats so that the temperature to be maintained in rooms containing the selected thermostats will be different from that previously maintained therein, said system otherwise operating continuously at normal pressure.

8. A temperature control system of the compressed air type comprising a conduit in communication with a source of air under pressure; thermostatically-controlled means for cutting off the delivery of a heating medium to a room or apartment; means for throwing said thermostatic means into and out of action; and means for temporarily varying, and thereafter restoring to normal the air pressure in the conduit and thereby actuating the means which throw the thermostatically controlled means into and out of action, the several means being operatively connected with the air conduit.

9. In a temperature control system of the compressed air type, comprising a conduit in communication with a source of compressed air, a source of heating medium, a valve controlling the delivery of such heating medium, and a pneumatic motor for actuating said valve; thermostatic means and mechanical means operable by variation of pressure in the air conduit for opening and closing said conduit between the compressed air source and the heat-control valve; a pneumatic motor in communication with the air conduit for actuating said mechanical means; an indicator; a pneumatic motor for operating said indicator, likewise in communication with the air conduit and operable in synchronism with said mechanical means through variation of pressure in said conduit; and means for temporarily reducing the pressure in the air conduit and thereafter restoring it to normal.

10. In a temperature control system of the pneumatic type, a thermostat and a control device therefor connected with the thermostat substantially as described; a pipe or conduit for delivering compressed air to the thermostat and to the control device; and means for temporarily reducing and shortly thereafter restoring normal pressure in the air pipe or conduit to effect operation of the control device.

11. The combination with a temperature regulating system including a plurality of fluid-pressure actuated thermostats each controlling a corresponding heating means, and a fluid pressure line connected to supply motive fluid to said thermostats; of a plurality of pressure motors each connected with said pressure line; a plurality of mechanisms each operatively associated with a corresponding motor and a corresponding thermostat to modify the controlling action of the thermostat, said mechanisms being operable step by step through said motors by successive surges of abnormal pressure in said pressure line; and means for producing such surges in said line.

12. The combination with a temperature regulating system including a plurality of fluid-pressure actuated thermostats each controlling a corresponding heating means, and a fluid pressure line connected to supply motive fluid to said thermostats; of a plurality of pressure motors each connected with said pressure line; a plurality of mechanisms each operatively associated with a corresponding motor and a corresponding thermostat to modify the controlling action of the thermostat, said mechanisms being operable step by step through said motors by successive surges of abnormal pressure in said pressure line; means for producing such surges in said line; and means associated with the various motors for disconnecting such motors individually from said line.

13. The combination with a temperature regulating system including a plurality of fluid-pressure actuated thermostats each controlling a corresponding heating means, and a fluid pressure line connected to supply motive fluid to said thermostats; of a plurality of pressure motors each connected with said pressure line; a plurality of mechanisms each operatively associated with a corresponding motor and a corresponding thermostat to modify the controlling action of the thermostat, said mechanisms being operable step by step through said motors by successive surges of abnormal pressure in said pressure line; means for producing such surges in said line; and means adjacent each thermostat operable at will to render the corresponding motor inoperative.

In testimony whereof I have signed my name to this specification.

CHARLES L. FORTIER.